(12) United States Patent
McFerrin

(10) Patent No.: US 10,537,091 B2
(45) Date of Patent: Jan. 21, 2020

(54) HUMMINGBIRD FEEDER WITH DUAL FOOD-HOLDING COMPARTMENTS

(71) Applicant: Stuart Tyson McFerrin, Knoxville, TN (US)

(72) Inventor: Stuart Tyson McFerrin, Knoxville, TN (US)

(73) Assignee: Ideology, LLC, Knoxville, TN (US)

( * ) Notice: Subject to any disclaimer, the term of this patent is extended or adjusted under 35 U.S.C. 154(b) by 312 days.

(21) Appl. No.: 15/731,998

(22) Filed: Sep. 29, 2017

(65) Prior Publication Data
US 2019/0098875 A1    Apr. 4, 2019

(51) Int. Cl.
*A01K 39/02* (2006.01)
*A01K 39/01* (2006.01)

(52) U.S. Cl.
CPC .......... *A01K 39/01* (2013.01); *A01K 39/0206* (2013.01)

(58) Field of Classification Search
CPC .............. A01K 39/0206; A01K 39/024; A01K 39/012; A01K 39/014; A01K 39/02; A01K 39/04; A01K 5/025
USPC .......................... 119/74, 72, 57.8, 77, 78, 80
See application file for complete search history.

(56) References Cited

U.S. PATENT DOCUMENTS

| | | | | | |
|---|---|---|---|---|---|
| 5,682,835 | A | * | 11/1997 | Walter | A01K 39/012 119/57.8 |
| 2010/0132618 | A1 | * | 6/2010 | Stone | A01K 39/02 119/63 |
| 2011/0297095 | A1 | * | 12/2011 | Cruz | A01K 39/02 119/80 |
| 2012/0060762 | A1 | * | 3/2012 | Cowger | A01K 39/0206 119/74 |
| 2014/0109835 | A1 | * | 4/2014 | Colvin | A01K 39/0206 119/74 |
| 2014/0158056 | A1 | * | 6/2014 | Vaughn, Jr. | A01K 39/0206 119/72 |
| 2015/0020742 | A1 | * | 1/2015 | Faunce | A01K 39/0206 119/78 |
| 2016/0150764 | A1 | * | 6/2016 | Felknor | A01K 39/0206 119/74 |
| 2016/0374318 | A1 | * | 12/2016 | Colvin | A01K 39/014 119/74 |
| 2017/0042116 | A1 | * | 2/2017 | Lindskov | A01K 5/0114 |

* cited by examiner

*Primary Examiner* — Yvonne R Abbott-Lewis
(74) *Attorney, Agent, or Firm* — Michael E. McKee

(57) ABSTRACT

A hummingbird feeder includes a base tray having an upwardly-opening interior for holding food which is attractive to fruit flies and further includes an upper tray which is positionable upon the base tray in a nested relationship and which includes an upwardly-opening interior for holding food, such as nectar, which is attractive to hummingbirds. A top cover for covering the upper tray includes a first aperture through which a fruit fly can exit the base tray and a second aperture through which a hummingbird can access the food of the upper tray. A passageway network extends between the interior of the base tray and the first aperture, and a closure assembly enables a user to selectively shut off or open communication between the interior of the base tray and the first aperture.

20 Claims, 6 Drawing Sheets

HUMMINGBIRD FEEDER WITH DUAL FOOD-HOLDING COMPARTMENTS

BACKGROUND OF THE INVENTION

This invention relates generally to bird feeders and relates, more particularly, to bird feeders intended for feeding hummingbirds.

Hummingbird feeders capable of holding foodstuff which is attractive to fruit flies which, in turn, are attractive to hummingbirds are known. One such feeder is shown and described in pending U.S. application Ser. No. 14/756,982, assigned to the same assignee to which the present application is assigned. Other hummingbird feeders are known which are capable of holding foodstuff, such as nectar, which is attractive to hummingbirds.

It would be desirable to provide a hummingbird feeder which is capable of holding both a first amount of foodstuff which is attractive to fruit flies and a second amount of foodstuff which is attractive to hummingbirds so that when the feeder is in use, a hummingbird present at the feeder is provided with the choice of foodstuff attractive to the bird and to fruit flies attracted to the second amount of foodstuff.

Accordingly, it is an object of the present invention to provide a new and improved hummingbird feeder.

Another object of the present invention is to provide such a feeder having one food-holding compartment capable of holding foodstuff which is attractive to fruit flies and another food-holding compartment which is capable of holding foodstuff which is attractive to hummingbirds.

Still another object of the present invention is to provide such a feeder whose food-holding compartments have a relatively large food-holding capacity and are easily accessible to a user.

Yet still another object of the present invention is to provide such a feeder whose food-holding compartments are in a superposed, or stacked, relationship.

A further object of the present invention is to provide such a feeder which can be readily disassembled for cleaning or maintenance.

A still further object of the present invention is to provide such a feeder whose food-holding compartment for holding foodstuff which is attractive to fruit flies can be closed off to trap fruit flies therein.

A yet still further object of the present invention is to provide such a feeder which is esthetically appealing.

One more object of the present invention is to provide such a feeder which can be placed upon a flat support surface for use or, in the alternative, can be suspended from an overhead support structure.

Still one more object of the present invention is to provide such a feeder which is uncomplicated in structure, yet effective in operation.

SUMMARY OF THE INVENTION

This invention resides in a hummingbird feeder including a base tray including a receptacle having an interior for holding food which is attractive to fruit flies and an upper tray disposed above the base tray including a receptacle having an interior for holding food which is attractive to hummingbirds. In addition, a top cover is associated with the upper tray and includes a first aperture and a second aperture wherein the second aperture provides a hummingbird with access to the interior of the second receptacle and the hummingbird-attracting food held therein. The upper tray includes means providing a passageway which extends between the interior of the receptacle of the base tray and the first aperture in the top cover enabling a fruit fly to pass from the interior of the receptacle through the first aperture in the top cover. The feeder also includes means associated with the passageway-providing means enabling a user to close off the passageway of the passageway-providing means to thereby prevent a fruit fly from exiting the interior of the receptacle of the base tray by way of the provided passageway.

BRIEF DESCRIPTION OF THE DRAWINGS

Further features, aspects and advantages of the present disclosure will become better understood by reference to the following detailed description, appended claims, and accompanying figures, wherein elements are not to scale so as to more clearly show the details, wherein the reference numerals indicate like elements throughout the several views, and wherein:

DETAILED DESCRIPTION OF AN ILLUSTRATIVE EMBODIMENT

Figure 1:
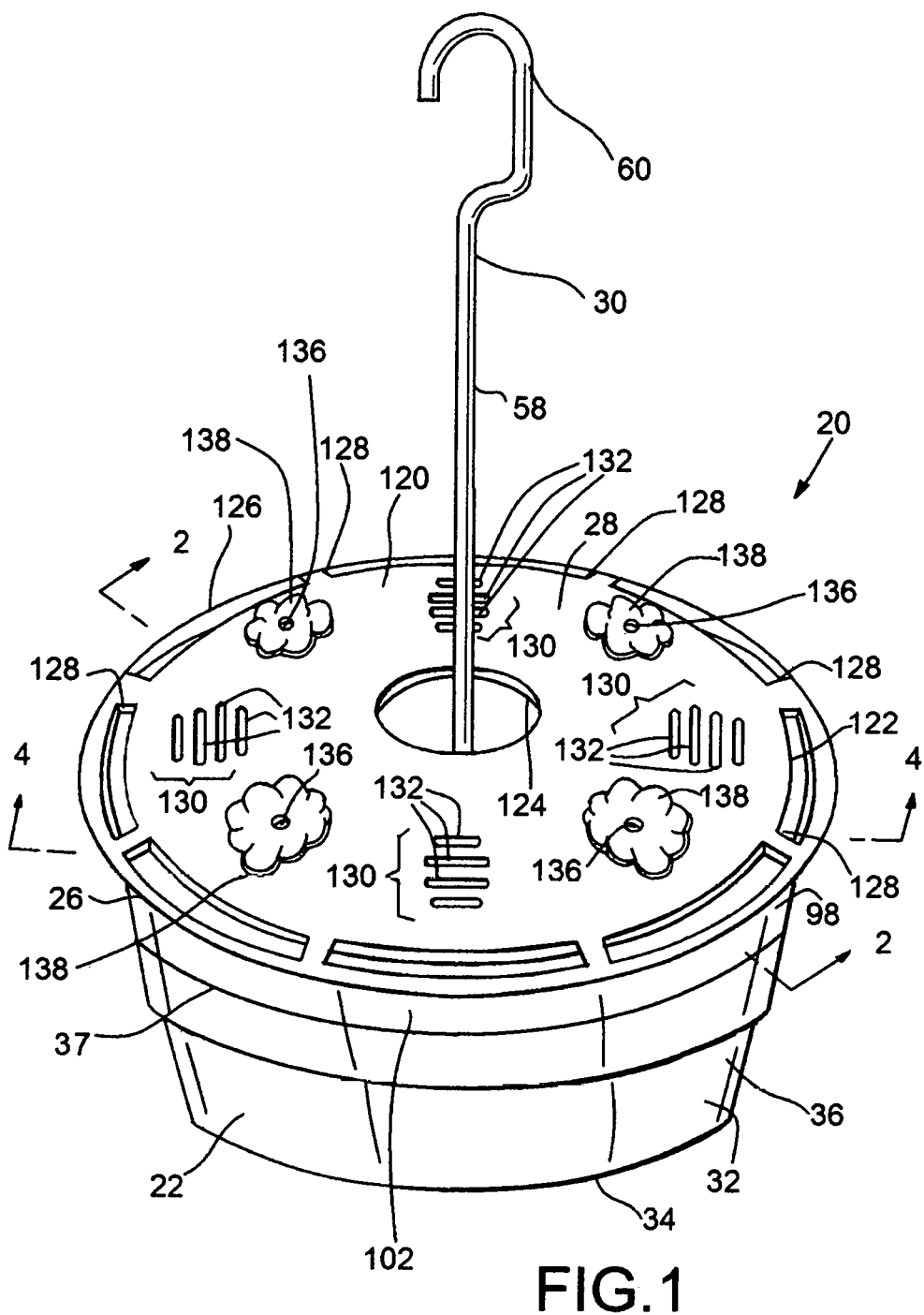
FIG. 1 is a perspective view of an embodiment of a hummingbird feeder within which features of the present invention are embodied.
Figure 2:
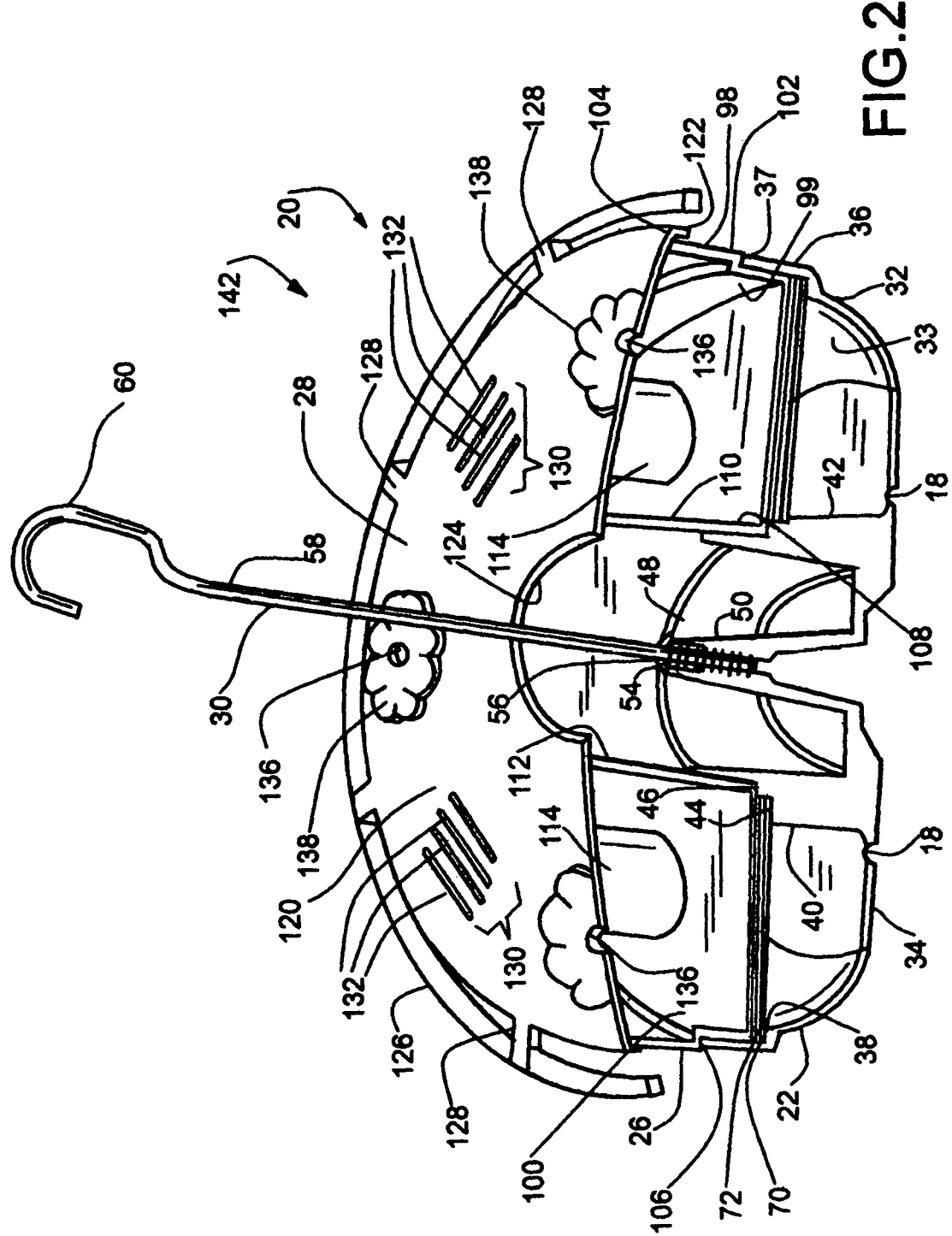
FIG. 2 is a longitudinal cross-sectional view of the FIG. 1 embodiment taken about along line 2-2 of FIG. 1.

Turning now to the drawings in greater detail and considering first FIGS. 1 and 2, there is illustrated an embodiment, generally indicated 20, of a hummingbird feeder within which features of the present invention are embodied. Briefly, the feeder 20 is of multiple-piece construction including a base tray 22 which is adapted to hold food intended to attract fruit flies, a closure assembly 24 which is positioned within the base tray 22, an upper tray 26 which is positioned atop the base tray 22 and which is adapted to hold food (e.g. nectar) intended to attract hummingbirds, and a top cover 28 which is positionable atop so as to cover the upper tray 26. When the aforedescribed components are assembled to form the feeder 20, the feeder 20 can be suspended for use with a hanger 30 (or other tension-bearing item, such as a cord or wire) from an overhead structure (not shown).

Figure 3:
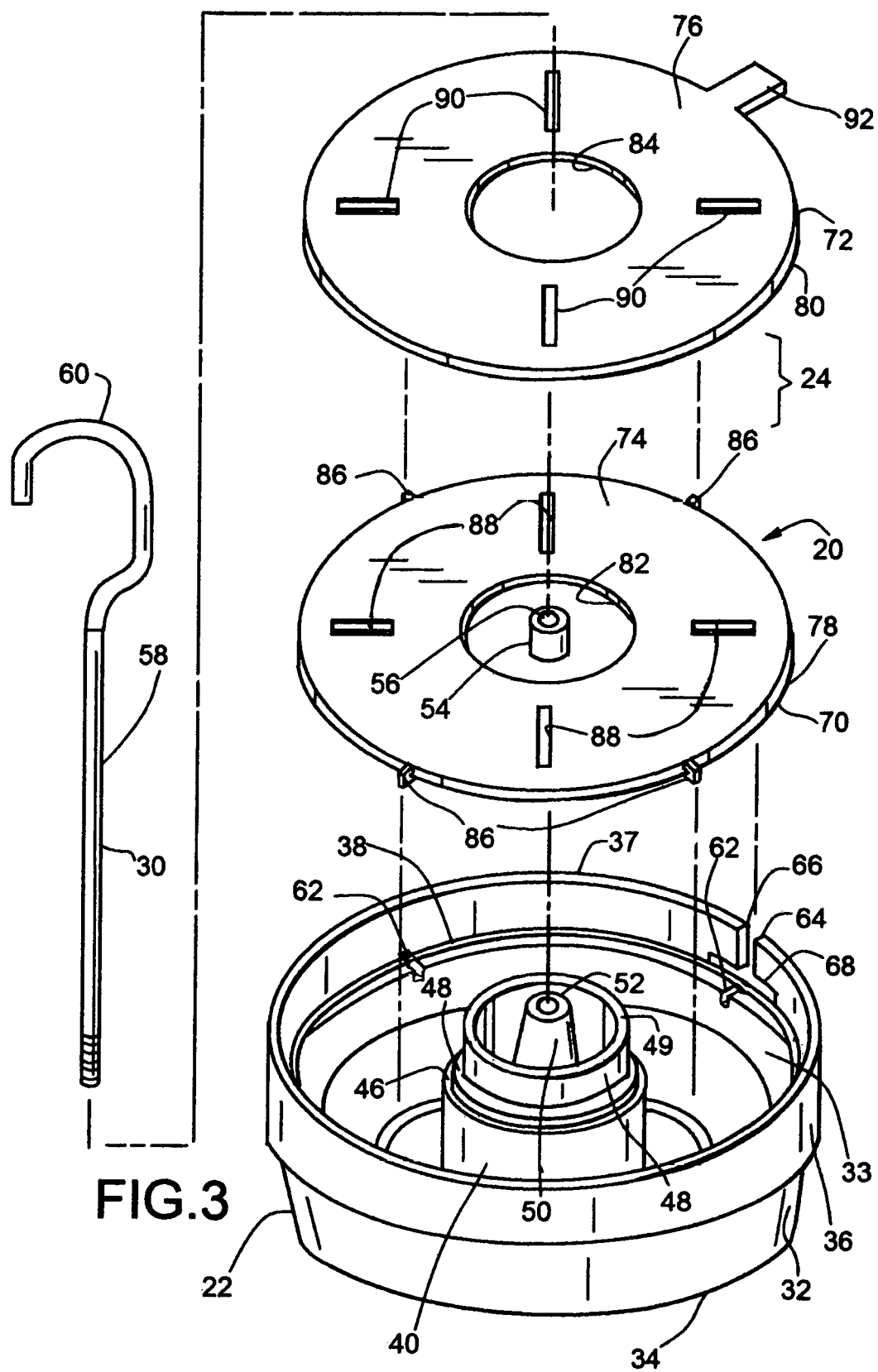
FIG. 3 is a perspective view of the base tray, closure assembly and hanger of the FIG. 1 embodiment, shown exploded.
Figure 4:
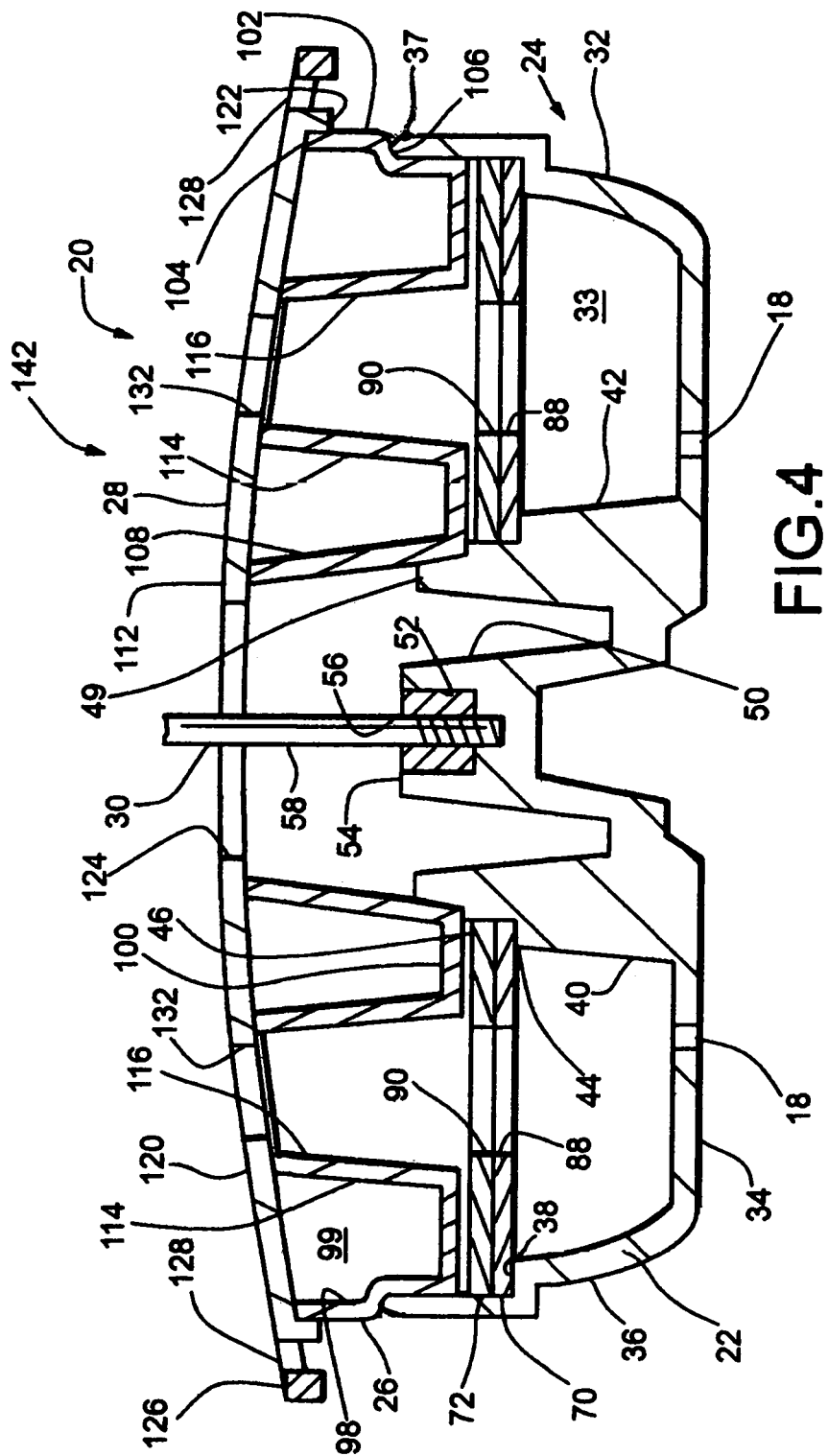
FIG. 4 is a longitudinal cross-sectional view of the FIG. 1 embodiment taken about along line 4-4 of FIG. 1 and depicting the closure assembly of the embodiment when disposed in its opened condition.

With reference to FIGS. 2-4, the base tray 22 includes an upwardly-opening receptacle 32 having a bottom 34 and outer walls 36 which are joined to so as to extend upwardly from the outer edges of the bottom 34 to a substantially circular upper edge 37. Formed within the outer walls 36 (and extending around the entirety of the base tray 22) is an upwardly-facing shelf 38 which is disposed within the interior, indicated 33, of the base tray 22 and is located about midway along the height of the outer walls 36 as a path is traced upwardly therealong from the bottom 34. In addition, there is provided a centrally-disposed, sleeve-like body 40 which is joined to so as to extend upwardly from the bottom 34 of the receptacle 32, and there are formed along the outer surface, indicated 42, of the body 40 a pair of upper and lower upwardly-facing shelves 44 and 46, respectively, which extend around the body 40. The lower shelf 44 is disposed at about the same horizontal level as the upwardly-facing shelf 38 formed within the outer walls 36 of the base tray 22 and, as will be apparent herein, cooperates with the upwardly-facing shelf 38 to provide support surfaces upon which the closure assembly 24 is adapted to rest when the feeder 20 is assembled. Meanwhile and as will be apparent herein, the upper shelf 46 provides a support surface upon which the upper tray 26 is adapted to rest, when the feeder 20 is in an assembled condition.

The centrally-disposed body 40 also includes an upper portion 46 which extends upwardly from the upper shelf 46 to a substantially circular upper edge 49. As will be apparent herein, this upper portion 46 of the centrally-disposed body 40 provides a spindle about which an appropriately-sized opening (described herein) provided within the bottom 34 of the upper tray 26 is positioned during assembly of the feeder 20. Further still, the base tray 22 is provided with a post portion 50 which is joined so as to extend upwardly from the center of the body 40. This post portion 50 includes a vertically-directed opening 52, and a bushing 54 having an internally-threaded opening 56 defined therein is secured (e.g. either force-fitted or glued) within the vertically-directed opening 52 for threadably accepting one end of the hanger 30 (described herein) with which the feeder 20 can be suspended from an overhead, or overhanging, support structure (not shown) for use of the feeder 20. The base tray 22 can be constructed (e.g. molded) out of a relatively hard plastic material, but other materials, such as wood or metal, can be used.

With reference still to FIG. 3, the upwardly-opening shelf 38 formed in the outer walls 36 of the base tray 22 includes s plurality of (i.e. four) upwardly-opening notches 62 (only two shown in FIG. 3) which are regularly spaced about the perimeter of the shelf 38. As will be apparent herein, these notches 62 nestingly accept portions of the closure assembly 24 for maintaining one component of the closure assembly 24 in a stationary condition with respect to the base tray 22 or, more specifically, to the upper portion 48 of the base tray 22. Furthermore, there is defined along the upper edge 37 of the outer walls 38 an upwardly-opening notch 64 which resembles, in appearance, an inverted T having a vertically-disposed leg portion 66 and a horizontally-disposed base portion 68 which is in communication with the lower end of the leg portion 66. As will be apparent herein, this notch 64 both accepts a tab portion 92 (FIG. 3) of the closure assembly 24 during assembly of the feeder 20 and accommodates a permitted movement of the tab portion 92 of the closure assembly 24 relative to the base tray 22.

Further still, the bottom 34 of the base tray receptacle 33 is provided with a plurality of (e.g. four) drain holes 18 (only two shown in FIG. 2) which are regularly spaced around the body 40 formed in the base tray 22.

With reference again to FIG. 3, the hanger 30 is elongated in shape having a linear shaft portion 58 and a crooked, U-shaped portion 60 having one leg which is fixedly joined to the shaft portion 58 at the upper end thereof. The lower end of the shaft portion 58 is externally-threaded and is adapted to be threadably-received by the internally-threaded opening 56 of the bushing 54 which is secured within the post portion opening 52. With the feeder 20 in an assembled condition and the lower end of the linear shaft portion 58 of the hanger 30 being threaded within the bushing 54, the hanger 30 can be used to support the feeder 20 from an overhead support structure by hooking the crooked portion 60 of the hanger 30 over the overhead support structure.

Although the depicted feeder 20 is being shown and described herein as being used for hanging the feeder 30 from an overhead support structure, other tension-bearing items, such as wire or a cord can be secured or tied to the post portion 50 by way of the vertically-directed opening 52 provided in the post portion 50 to suspend the feeder 20 from an overhead support structure. Furthermore and as an alternative to hanging the feeder 20 from an overhead support structure, the feeder 20, by virtue of the substantially flat bottom 34 of the base tray 22, can be placed upon an upwardly-facing support surface (not shown) for use of the feeder 20. In order to support the feeder 20 atop such a support surface, neither the hanger 30 nor any other tension-bearing item secured to the post portion 50 would be necessary.

With reference still to FIGS. 2-4, the closure assembly 24 is comprised of a pair of discs 70, 72 wherein each disc 70 and 72 has a major, platen-shaped disc portion 74 or 76, respectively, having a circular outer edge 78 or 80, respectively, and a center hole 82 or 84 which is sized to be closely accepted by the upper portion 48 of the body 40 when, during assembly of the feeder 20, the discs 70, 72 are lowered downwardly over the body 40 to the lower shelf 44 thereof. The discs 70, 72 are positioned in a stacked relationship so that one disc 72 overlies, or is stacked upon, the other disc 70 and so that the center holes 82, 84 are disposed in vertical registry with one another. Moreover, each disc portion 74 or 76 defines a plurality of (e.g. four) openings 88 or 90, respectively, which extend between the upper and lower surfaces of the disc portions 74 and 76 and are capable of being positioned in substantially vertical registry with one another. That is to say that the discs 70, 72 can be positioned in such a relationship with one another that each of the openings 90 of one disc 72 is substantially vertically aligned with a corresponding opening 88 of the other disc 70. The openings 88 or 90 of the disc portions 74 or 76 are disposed at regularly-spaced intervals about the upper surface of the disc portion 74 or 76, and each opening 88 or 90 is in the form of an elongated slot whose longitudinal axis extends substantially radially of the corresponding disc portion 74 or 76.

Figure 5:
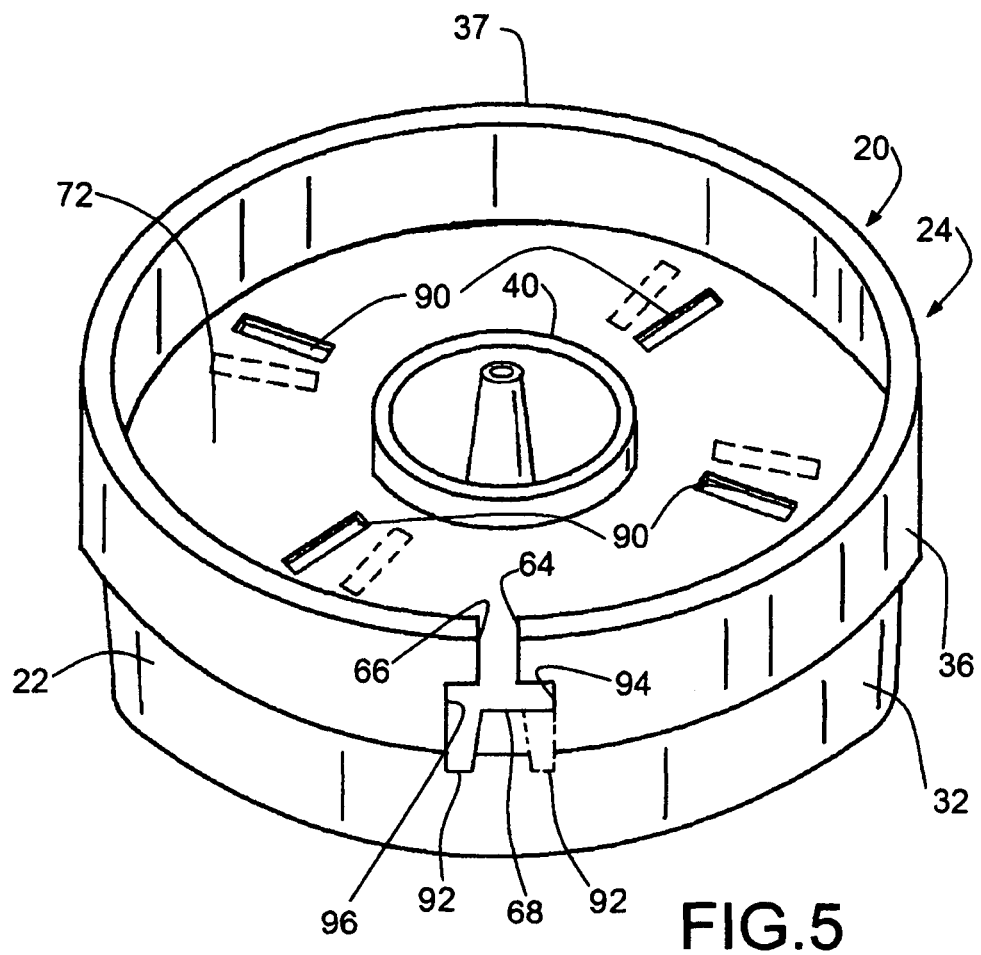
FIG. 5 is a perspective view of the base tray with the closure assembly positioned therein.
Figure 6:
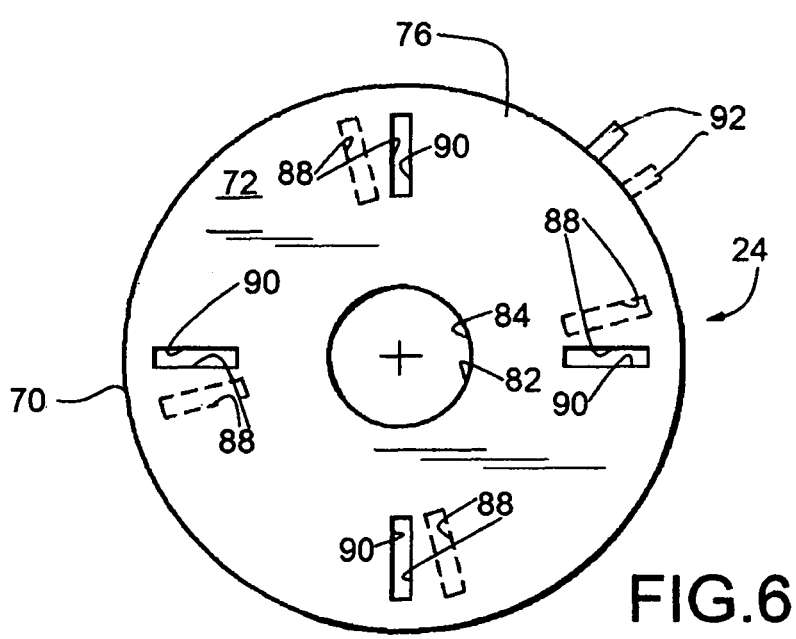
FIG. 6 is a top plan view of the closure assembly as seen generally from above in FIG. 5.

With reference to FIGS. 4-6 and when the discs 70, 72 are arranged in the aforedescribed stacked relationship and positioned about the upper portion 48 of the body 40, the upper disc 72 can be rotated in position about its center hole 84 thereof (or, more specifically, about the upper portion 48 of the body 40) between a first (rotational) condition with respect to the (lower) disc 70 at which the openings 90 of the (upper) disc 72 are positioned in substantially vertical, or aligned, registry with the openings 88 of the (lower) disc 70 and a second (rotational) condition at which the openings 90 of the (upper) disc 72 are positioned out of vertical registry with the openings 88 of the (lower) disc 70. The position of the openings 90 of the (upper) disc 72 relative to the openings 88 of the lower disc 70 when the (upper) disc is disposed in the first condition are depicted in solid lines in FIGS. 4-6, and the position of the openings 90 of the (upper) disc 72 relative to the position of the (lower) disc openings 88 is depicted in phantom in each of FIGS. 5 and 6. As will be apparent herein, this rotational shifting of these discs 70, 72 relative to one another about the body 40 between the aforementioned first and second conditions permits access between or shuts off access between the upper surface of the (upper) disc 72 and the lower surface of the (lower) disc 70 through the disc openings 88.

In addition, the (lower) disc 70 includes a plurality of (i.e. four) tabs 86 (best shown in FIG. 3) which are joined to the disc portion 74 at regularly-spaced intervals about the circumference thereof and so that a portion of each tab 86 projects downwardly of the disc portion 74 at the circular outer edge 78. Further still, the (upper) disc 72 includes a tab portion 92 (introduced earlier) which is joined to the disc portion 76 along the circular outer edge 80 thereof so as to extend radially outwardly of the disc center hole 84.

During assembly of the feeder 20, the disc portions 74, 76 of the discs 70, 72 are positioned in the stacked relationship (as described above) and lowered into the interior of the base tray 22 through the upper edge 37 thereof so that the tab portion 92 is guided downwardly through the vertical leg portion 66 of the notch 62 and so that the vertically-aligned center holes 82, 84 are guided downwardly about the upper portion 48 of the base tray body 40. The disc portions 74, 76 continue to be lowered about the base tray body 40 until the disc portions 74, 74 come to rest upon the lower shelf 44 of the body 40. The discs 70, 72 are then manipulated, or rotated in position about the body 40, as necessary, until the downwardly-projecting tabs 86 of the (lower) disc 70 are accepted by the upwardly-opening notches 62 defined along the upwardly-facing shelf 38 of the base tray 22. With the downwardly-projecting tabs 86 accepted by the notches 62, the (lower) disc 70 is prevented from rotating, or shifting in its rotational orientation, about the body 40 and is therefore stationary with respect to the base tray 22.

Meanwhile, (upper) disc 72 which is positioned so as to overlie the (lower) disc 70 remains free to be rotated about its center hole 84 and about the body 40 to the extent that its tab portion 92 can be moved along the length of the horizontally-disposed portion 68 of the notch 64 provided in the outer walls 36 of the base tray 22. This acceptance by the horizontally-disposed portion 68 of the notch 64 by the tab portion 92 and the subsequent permitted rotation of the (upper) disc 72 about the body 40 enables a user to shift the (upper) disc 72 relative to the (lower) disc 70 between the aforedescribed first and second (rotational) conditions by shifting the tab portion 92 between its permitted (e.g. FIG. 5 phantom-line and FIG. 5 solid-line) limits of travel along the horizontal base portion 68 of the notch 64.

It follows that the disc portions 74, 76 of the discs 70, 72 are sized to be closely accepted by the interior of the base tray receptacle 32 provided between the outer edges of the upwardly-opening shelf 38 of the outer walls 36 of the base tray 22 and the lower shelf 44 of the body 40 of the base tray 22, and the downwardly-projecting tabs 86 are sized to be closely accepted by the upwardly-opening notches 62 provided in the upwardly-facing shelf 38 of the base tray 22. In addition, the disc portions 74, 76 of the discs 70, 72 are disposed in such a relationship with one another and the tab portion 92 is disposed in such a relationship with the base portion 68 of the notch 64 so that when the tab portion 92 is disposed at one end, indicated 94 in FIG. 5, of the base portion 68 of the notch 64, the discs 70, 72 are disposed in the aforedescribed first condition at which the openings 88, 90 are in vertical (or aligned) registry with one another and so that when the tab portion 92 is disposed at the opposite end, indicated 96 in FIG. 5, of the base portion 68 of the notch 64, the discs 70, 72 are disposed in the aforedescribed second condition at which the openings 88, 90 are out of vertical (or aligned) registry with one another. It also follows that the tab portion 96 has a thickness which is sized in such a relation to the height of the base portion 68 of the notch 64 to permit the tab portion 96 to be freely moved between the ends 94, 96 of the base portion 68 of the notch 64 as the (upper) disc 72 is rotated in position about the body 40 of the base tray 22 between the first and second rotational conditions.

Figure 7:
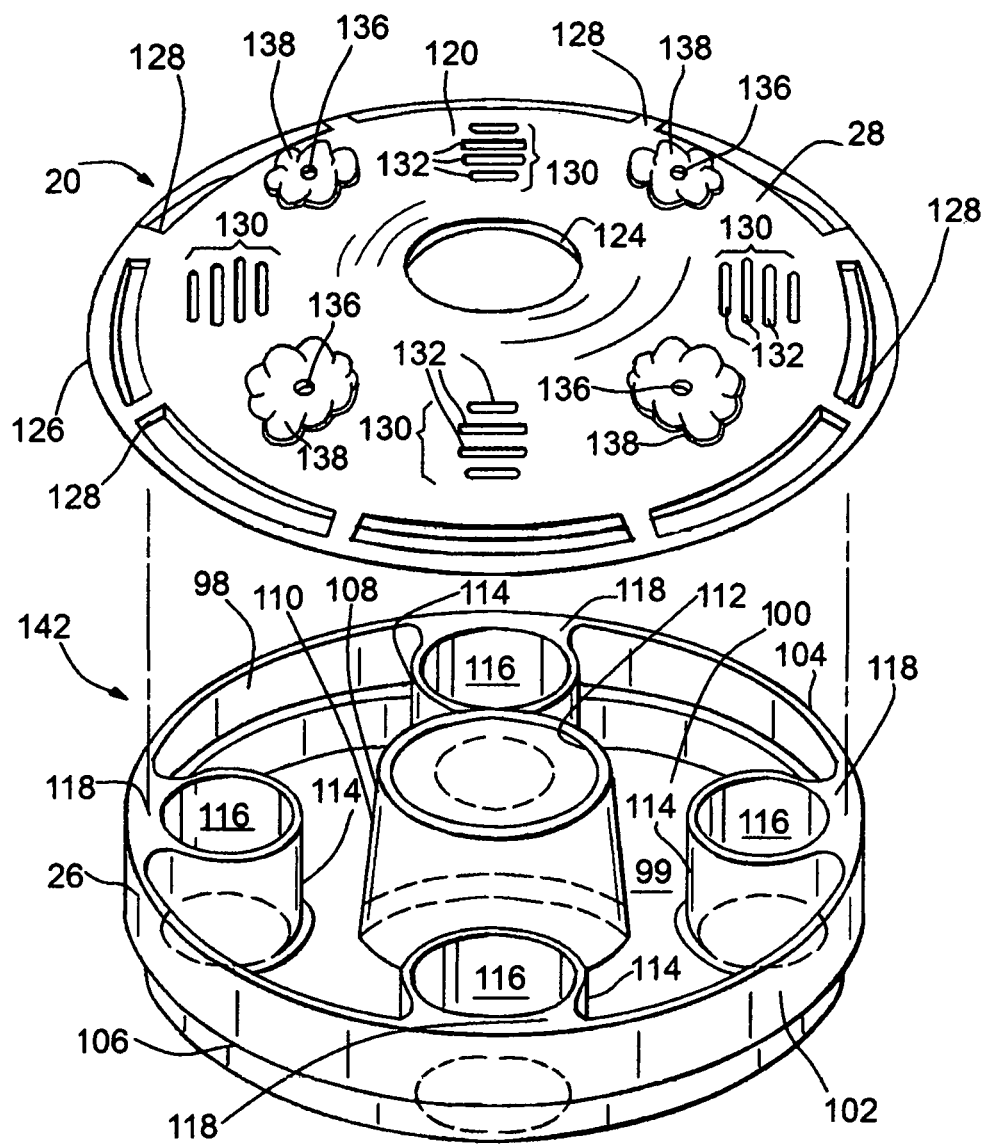
FIG. 7 is a perspective view of the upper tray and top cover of the FIG. 1 embodiment, shown exploded.

With reference to FIGS. 2, 4 and 7, the upper tray 26 includes an upwardly-opening receptacle 98 having a bottom 100 and outer walls 102 which are joined to so as to extend upwardly from the outer edges of the bottom 100 to a substantially circular upper edge 104. Formed within the outer walls 102 (and extending around the entirety of the upper tray 26) is a downwardly-facing shelf 106 which is disposed within the interior, indicated 99, of the upper tray receptacle 98 and which is located about midway along the height of the outer walls 104 as a path is traced downwardly therealong from the upper edge 104. In addition, there is provided a centrally-disposed, sleeve-like body 108 which is joined to so as to extend upwardly from the bottom 100 of the upper tray 26. The sleeve-like body 108 defines outer surfaces 110 which provide, in conjunction with the bottom 100 and the outer walls 102 of the upwardly-opening receptacle 98 of the upper tray 26, the receptacle interior 99. Meanwhile, the sleeve-like body 108 defines a vertically-opening through-opening 112 which opens above and below of the upper tray 26.

The upper tray 26 is adapted to be nestingly positioned within the interior of the base tray 22 and rest above the closure assembly 24 as the downwardly-facing shelf 106 engages the upper edge 37 of the outer walls 38 of the base tray 22 and the bottom 100 of the upper tray 26 engages the upper shelf 46 defined in the body 40 of the base tray 22. With the upper tray 26 thus supported by the base tray 22 in a spaced relationship with the (upper) disc 72 of the closure assembly 24, the (upper) disc 72 is free to be rotated about the body 40 between the aforedescribed first and second conditions without interference from the upper tray 26. It follows that the outer walls 102 of the upper tray 26 are sized so that they can be closely accepted by the upper edge 104 of the outer walls 36 of the base tray 22, and the through-opening 112 provided within the sleeve-like body 108 of the upper tray 26 is sized to closely accept the upper portion 48 of the body 40 of the base tray 22 when the bottom 100 of the upper tray 26 is lowered downwardly into a position of rest atop the upper shelf 46.

The upper tray 26 also includes means, generally indicated 142 in FIG. 4, providing a passageway 144 which enables the interior 33 of the base tray 22 to communicate with the region disposed immediately above the receptacle 98 of the base tray 22 by way of the disc openings 88, 90 when positioned in vertical registry with one another. Within the depicted feeder 20, the passageway-providing means 142 are provided by a plurality of (i.e. four) hollow columns 114 which are regularly spaced about the bottom 100 of the upper tray 26 and wherein each column 114 provides a vertically-arranged passageway 116 through the hollow interior of the column 114. That is to say, the mouths of the passageway 116 disposed at the upper and lower ends of the passageway 116 open upwardly and downwardly, respectively.

When the feeder 20 is assembled and the upper tray 26 is positioned within the base tray 22, each column passageway 116 is vertically aligned with a corresponding opening 88 provided in the (lower) disc 70. This being the case and when the (upper) disc 72 of the closure assembly 24 is disposed in its first condition at which the openings 88, 90 of the discs are vertically aligned with one another, access is provided to the interior of the base tray receptacle 32 by way of the interior of the passageways 116 and the vertically-aligned openings 88, 90. Within the depicted feeder 20, the columns 114 are reinforced in strength by an amount 118 of material which spans the distance between the outer walls 102 and the columns 114. The upper tray 26, like the discs 70 and 72, can be constructed (e.g. molded) out of a relatively hard plastic material, but other materials can be used.

With reference again to FIGS. 1 and 2, the top cover 28 includes a cover portion 120 which is adapted to span the upper edge 104 of the upper tray 26 and a substantially cylindrically-shaped lip portion 122 which is joined to so as to extend downwardly from the cover portion 120 at the outer edge thereof. The cover portion 120 also includes a center hole 124 and is somewhat dome-shaped so that the cover portion 120 is slightly higher at the edge of the center hole 124 than it is along the outer edges of the cover portion 120. The top cover 28 also includes a ring 126 which is arranged so as to surround the cover portion 120 and is joined to the cover portion 120 adjacent the outer edges thereof by way of a plurality of (e.g. four) ribs 128 which extend between the ring 126 and the cover portion 120.

It is a feature of the feeder 20 that the top cover 28 is sized so that when positioned upon the upper tray 26, the upper edge 104 of the outer walls 102 of the upper tray 26 is nestingly accepted by the lip portion 122 of the top cover 28. Accordingly, the diameter of the cover portion 120 as measured across the inside surfaces of the lip portion 122 is slightly larger than the diameter of the upper tray 26 as measured across the upper edge 104. It is also a feature of the feeder 20 that the ring 126 provides a perch upon which hummingbirds can stand.

With reference to FIGS. 1-3, the top cover 28 also includes two sets of through-apertures, described herein, through which a hummingbird is provided access to the interior of the upper tray 26 and to the interior of the base tray 22. More specifically, the cover portion 120 of the top cover 28 includes a plurality of (i.e. four) groups 130 of first apertures 132 which are disposed in a regularly-spaced arrangement across the upper surface of the cover portion 120 and a plurality of (i.e. four) second apertures 136 which are disposed in a regularly-spaced fashion across the upper surface of the cover portion 120. In this connection, each of the second apertures 136 are positioned between a corresponding pair of groups 130 of first openings 132.

Within the depicted feeder 20, each group 130 of first apertures 132 includes a series of (e.g. four) narrow slits which are closely arranged in order to provide the group 130 with a degree of esthetic appeal. Moreover, the four groups 130 of apertures 132 are disposed in such a relationship across the upper surface of the cover portion 130 so that when the top cover 28 is positioned in a desired position upon the upper tray 26 so that the upper edge 104 of the outer walls 102 is nestingly accepted by the lip portion 122, each group 130 of first apertures 132 are arranged in a vertical (or aligned) registry with the passageway 116 of a corresponding column 114 so that each passageway 116 of the four columns 114 of the upper tray 26 is overlain by a corresponding group 130 of first apertures 132 so that the interior of each passageway 116 communicates with the region disposed immediately above the top cover 28 through the apertures 132 of a corresponding group 130.

During use of the feeder 20, a fruit fly is permitted to enter or exit the interior 33 of the base tray receptacle 32 by way of the first apertures 132 and the passageways 116 of the columns 114. In particular, fruit flies (which are attracted to the fruit fly-attracting food, such as bananas, pears or other fruit, held within the interior 33 of the base tray 22) are permitted to enter the base tray interior 33 by passing in sequence downwardly through one of the first apertures 132, the hollow passageway 116 of a column 114, and then through the vertically-aligned openings 88 and 90 of the closure assembly 24.

In connection with the foregoing, each slit which provides one of the first apertures 132 is large enough to permit the passage of a fruit fly therethrough but small enough to discourage, or prevent, the passage of larger insects, such a bees, therethrough in order to access the fruit fly-attracting food contained within the base tray receptacle 33. To this end, any slit which comprises a first aperture 132 possesses a width of between about 1/16 inches and 1/4 inches, and preferably possesses a width (as measured transversely across the first aperture 132) of about 1/8 inches so that the width of any slit approximates the width of an adult fruit fly.

Furthermore, while the slits which comprise each of the four groups 130 of the first apertures 132 are depicted within FIGS. 1, 2 and 7 as being substantially elongate in shape, it will be understood that the apertures provided by these slits can be provided with alternative shapes for allowing a fruit fly to enter or exit the interior 33 of the base tray receptacle 32. For example, any of the first apertures 132 can possess a cross section which is circular in shape, rectangular in shape or possess any of a number of alternative shapes. In another embodiment of the feeder 20, any of the first apertures 132 can be at least partially covered by a mesh material which is sized to allow fruit flies to enter and exit the interior 33 of the base tray receptacle 32 while discouraging or preventing insects, such as bees, which are appreciably larger than an adult fruit fly from entering the receptacle 28 through any of the first apertures 132.

Meanwhile, each of the second apertures 136 provided in the cover portion 120 is of circular shape and is sized to permit the beak of a hummingbird to extend into the receptacle 98 of the upper tray 26 to reach the hummingbird-attracting food (e.g. nectar) which is contained within the upper tray 26 of the feeder 20. At the same time, it is preferable that the second apertures 136 are not so large as to permit the passage of insects, such as bees, which are appreciably larger than the width of the beak of a hummingbird into the receptacle 98 of the upper tray 26 and the fruit fly-attracting foodstuff contained therein. In addition and within the depicted feeder 20, each of the second, or beak-accepting, apertures 136 is surrounded by flower-resembling button 136 to enhance the visual esthetics of the feeder 20. To this end, each button 136 includes a center opening which is positioned in vertical registry with a corresponding one of the second apertures 132, and each button 136 is preferably incorporated (as in a molding process) within the cover portion 120 of the top cover 28. As is the case with the base and upper trays 22 and 26, the top cover 28 can be constructed (e.g. molded) out of a material (such as a relatively hard plastic), but the top cover 28 can be constructed out of alternative materials.

It follows from the foregoing that a hummingbird feeder 20 has been described which is capable of holding two classes of foodstuffs for the purpose of attracting two different creatures (i.e. hummingbirds and fruit flies). More specifically and on one hand, the base tray 22 has a receptacle interior 33 which is adapted to hold foodstuff, such as bananas (or banana peels), peaches or other fruit, which is attractive to fruit flies which is, in turn, attractive to hummingbirds. On the other hand, the upper tray 26 has an receptacle interior 99 which is adapted to hold food, such as liquid-based nectar, which is known to be attractive to hummingbirds. During use of the feeder 20—and during which the closure assembly 24 is arranged in its first, or fully opened, condition at which the openings 88, 90 are arranged in the vertically aligned relationship with one another, fruit flies are able to exit the interior 33 of the base tray receptacle 32 by way of the vertically-aligned openings 88, 90, the hollow interiors of the passageways 118 of the columns 114 of the upper tray 26 and the first apertures 132 associated with the top cover 28. Meanwhile, hummingbirds which are disposed above the top cover 28 or which may be perched upon the ring 126 of the top cover 28 have access to either the fruit flies which exit the feeder 20 by way of the first apertures 132 or to the nectar contained within the interior 99 of the upper tray receptacle 98 by way of the second, or beak-accepting, apertures 136.

The aforedescribed base and upper trays 22 and 26 are in a superposed relationship so that the upper tray 26 is disposed directly above, and in overlying relationship with, the base tray 22, and the passageway network provided by the aligned openings 88, 90 of the closure assembly 24, the passageways 116 of the columns 114 and the first apertures 132 provide a means by which fruit flies can fly into or out of the base tray receptacle 32 through the top cover 28 while leaving undisturbed the nectar-containing interior of the upper tray 26. When it becomes necessary to detach the upper tray 26 from the remainder of the feeder 20 to, for example, clean the interior 99 of the upper tray receptacle 98, the tab portion 92 of the (upper) disc 72 is moved from one end 94 of the base portion 68 of the notch 64 to the opposite end 96 of the base portion 68 of the notch 64 to thereby move the (upper) disc 72 (and thus the closure assembly 24) to the second, or closed, condition at which the openings 88, 90 of the discs 70, 72 are positioned out of vertical registry with one another, and the upper tray 26 is thereafter simply lifted from its position of rest upon the upper edge 37 and the upper shelf 46 of the base tray 22. The top cover 28 can thereafter be lifted from the upper edge 104 of the upper tray 26 to expose the interior 33 of the upper tray 26 for cleaning or to add or replace the nectar contained within the upper tray 26.

The advantage provided by the closure assembly 24 and its capacity to close off access to the interior 33 of the base tray 26 relates to the fact that the base tray interior 33 may be filled with fruit flies at the time it is desired to remove the upper tray 26 from the base tray 22 for cleaning or maintenance. In other words and to reduce the likelihood that the user will be struck in the face by flying fruit flies exiting the interior 33 of the base tray receptacle 32 when the upper tray 26 is removed from the base tray 22, the (upper) disc 70 (and thus the closure assembly 24) is moved to its second, or closed, condition, at which the openings 88, 90 are positioned out of vertical registry so that fruit flies cannot exit the base tray receptacle 32 by way of the disc openings 88. Once the upper tray 26 (with the top cover 28 positioned thereon) has been replaced upon the base tray 22, the tab portion 92 can thereafter be returned to the end 94 of the base portion of the notch 62 to re-establish fruit fly access to or from the interior 33 of the base tray receptacle 32 by way of the vertically-aligned openings 88, 90.

While the description above contemplates a substantially cylindrically-shaped assembly comprised of the base tray 22, closure assembly 24, upper tray 26 and top cover 28, other embodiments of the feeder could include rectangular or polygonal-shaped components such that the overall shape of the feeder 20 varies according to other desirable configurations. For example, the sides of the feeder 20 could be flat and somewhat rectangular in shape. Similarly, the base tray 22, when viewed in a plan view, could be substantially rectangular or possess an alternative polygonal shape.

To prepare the feeder 20 for use, the upper tray 26 (with the top cover 28 positioned thereon) and the discs 70, 72 of the closure assembly 24 are removed (i.e. lifted) from the interior 33 of the base tray 26 to expose the interior 32 of the base tray receptacle 32 to the user. Fruit fly-attracting food, such as banana peels or other fruit, is then placed into the base tray receptacle interior 33, and then the disc 70, the disc 72 and then the upper tray 26 are replaced, in sequence, within the base tray 22. The tab portion 92 of the upper disc 72 is then appropriately positioned adjacent the end 94 of the base portion 68 of the notch 64 to position the disc openings 88, 90 in substantially vertically aligned relationship with one another.

The top cover 28 is then removed from the upper tray 26 to expose the interior 99 of the upper tray receptacle 98 to the user. With the upper tray receptacle interior 99 thus exposes, fruit fly-attracting food, such as nectar, is placed, or poured, within the receptacle interior 99, and then the top cover 28 is replaced upon the upper tray 26. If desired, the hanger 30 (FIGS. 1-3) can be secured to the post portion 50 in order to suspend the feeder 20 from an overhead support structure, such as a beam which extends across the top of a porch of a home.

Fruit flies can fly about the feeder 20 and gain access to the foodstuff contained within the base tray receptacle 32 by way of the first apertures 132, the passageways 116 and the disc openings 88 and 90 (when positioned in vertical registry with one another). Inside the receptacle 32, the fruit flies lay their eggs, and the eggs subsequently hatch yielding more fruit flies. The fruit flies can thereafter fly out of the feeder 20 through the disc openings 70, 72 (when vertically aligned), the passageways 114 of the hollow columns 114 and the first apertures 132 provided in the top cover 28. Once airborne, the fruit flies are caught by the hummingbirds, who can eat about one-hundred and fifty fruit flies per day. The fruit flies provide the hummingbirds with protein, without which hummingbirds will die.

The top cover 28 blocks ants, most variety of bees and squirrels from entering the receptacle 98 of the upper tray 26, and the feeder 20 (or portions thereof) can be bright red in color so that the feeder 20, with the flower-resembling buttons 138 integrally formed within the top cover 28, is esthetically-appealing in appearance.

Several exemplary dimensions of the feeder 20 are provided here as follows. The overall height of the feeder 20 (disregarding the height of the hanger 30), when assembled, is about 3.5 inches; the width of the cover portion 120 of the top cover 28 and the base tray 22 is about 8.0 inches; the width of the top cover 28 as measured across the ring 126 thereof is about 9.0 inches; the depth of the receptacle interior 99 is about 1.5 inches; the depth of the receptacle interior 33 is about 2.0 inches; and the overall height of the base tray 22 is about 2.5 inches.

Unlike a traditional nectar or water-based hummingbird feeder, the base tray 22 of the feeder 20 does not require continuous maintenance in order to prevent a bait from spoiling and thereby causing the hummingbirds to become sick upon injecting the bait. Because the base tray 22 of the feeder 20 provides fruit flies for hummingbird consumption, the feeder 20 is not dependent upon maintaining the bait in a fresh, unspoiled condition or otherwise ensuring that the bait is not contaminated. However and in the event that the fruit fly-attracting food spoils or otherwise becomes unsuitable for spawning fruit flies, the number of fruit flies at the feeder 20 may be reduced, but the hummingbirds will not likely ingest the fruit fly-attracting food contained within the base tray 22.

It will be understood that numerous modifications and substitutions can be had to the aforedescribed embodiment 20 without departing from the spirit of the invention. Accordingly, the aforedescribed embodiment 20 is intended for the purpose of illustration and not as limitation.

The invention claimed is:

1. A hummingbird feeder comprising:
a base tray including a receptacle having an interior for holding food which is attractive to fruit flies;
an upper tray disposed above the base tray including a receptacle having an interior for holding food which is attractive to hummingbirds;
a top cover associated with the upper tray and including a first aperture and a second aperture wherein the second aperture provides a hummingbird with access to the interior of the second receptacle and the hummingbird-attracting food held therein;
wherein the upper tray includes means providing a passageway which extends between the interior of the receptacle of the base tray and the first aperture in the top cover enabling a fruit fly to pass from the interior of the receptacle through the first aperture in the top cover; and
means associated with the passageway-providing means enabling a user to close off the passageway of the passageway-providing means to thereby prevent a fruit fly from exiting the interior of the receptacle of the base tray by way of the provided passageway.

2. The feeder as defined in claim 1 wherein the associated means includes a closure assembly having a first member which covers the interior of the receptacle of the base tray and defines an opening which opens between the interior of the receptacle of the base tray and the passageway of the passageway-providing means, and wherein the closure assembly further includes a second member for closing the opening of the first member, the second member being movable relative to the opening of the first member between a first condition at which access is provided to the passageway of the passageway-providing means from the interior of the receptacle of the base tray by way of the opening defined in the first member and a second condition at which access to the passageway of the passageway-providing means from the interior of the receptacle of the base tray is shut off.

3. The feeder as defined in claim 2 wherein the first and second members of the closure assembly are provided by a pair of discs which are arranged in a stacked relationship so that one of the pair of discs overlies the other of the pair of discs, a first of the pair of discs defines said opening, and the second of the pair of discs is movable relative to said opening defined in the first of the pair of discs between the aforesaid first and second conditions.

4. The feeder as defined in claim 3 wherein the second of the pair of discs includes a tab portion which enables a user to move the second of the pair of discs between the first and second conditions.

5. The feeder as defined in claim 4 wherein the upper tray includes an outer wall and the tab portion extends outboard of the outer wall.

6. The feeder as defined in claim 1 wherein the passageway of the upper tray is provided by a hollow column formed within the upper tray and which is oriented substantially vertically through the interior of the upper tray.

7. The feeder as defined in claim 1 wherein the interior of the base tray opens substantially upwardly and has an upper edge which is shaped to nestingly accept the upper tray placed downwardly within the base tray so that when the feeder is assembled for use, the upper tray is captured by the upper edge of the base tray.

8. The feeder as defined in claim 1 wherein the base tray includes a bottom and a post portion which is positioned substantially centrally of the bottom and is arranged so as to extend substantially upwardly therefrom, and each of the upper tray and the top cover defines a centrally-disposed opening which is substantially positioned in vertical registry with the post portion of the base tray when the upper tray and top cover are positioned upon the base tray for use of the feeder, and the post portion facilitates the suspension of the feeder from an overhead support structure.

9. The feeder as defined in claim 8 further including a hanger having a hook portion and a shaft portion which extends from the hook portion, and the shaft portion is securable to the post portion so that the feeder can be suspended from an overhead support structure by way of the hook portion.

10. A hummingbird feeder comprising:
a base tray including a receptacle having an upwardly-opening interior for holding food which is attractive to fruit flies;
a closure assembly which is positionable upon the base tray for covering the upwardly-opening interior of the base tray receptacle, and the closure assembly including a first disc defining an opening therein and further including a second disc defining a through-opening therein and wherein the second disc is movable relative to the opening defined in the first disc between a first condition at which the through-opening of the second disc is substantially positioned in registry with the opening defined in the first disc so that access is provided to the interior of the base tray receptacle by way of the defined opening and the through-opening and a second condition at which the defined opening of the first disc and the defined through-opening of the second disc are positioned out of registry with one another so that access to the interior of the base tray receptacle is shut off;
an upper tray including a receptacle for holding a food which is attractive to hummingbirds, the receptacle of the upper tray including a bottom and a hollow column which is joined to so at to extend upwardly from the bottom of the upper tray receptacle to an open mouth, the hollow column disposed in such a relationship to the opening defined in the first disc so that when the defined opening and the defined through-opening are substantially positioned in registry with one another, access can be had to the interior of the base tray receptacle through the mouth of the hollow column; and
a top cover which is positionable upon the upper tray and which includes a top portion for covering the upwardly-opening interior of the upper tray receptacle when the top cover is positioned upon the upper tray and wherein the top portion defines a first aperture through which a fruit fly is permitted to pass, and the first aperture is positioned in such a relationship to the upper tray so that when the top cover is operatively positioned upon the upper tray and the defined opening and the defined through-opening of the first and second discs are substantially disposed in registry with one another, the first aperture is substantially disposed in registry with the mouth of the hollow column to permit a fruit fly to exit the interior of the base tray receptacle by way of the hollow column and the first aperture; and the top portion includes a second aperture through which a hummingbird is provided with access to the hummingbird-attracting food held within the interior of the upper tray receptacle.

11. The feeder as defined in claim 10 wherein the second disc includes a tab portion which enables a user to move the second disc between the first and second conditions.

12. A hummingbird feeder comprising:
a base tray including a receptacle having an upwardly-opening interior for holding food which is attractive to fruit flies;
an upper tray disposed in a superposed relationship with the base tray and including a receptacle having an upwardly-opening interior for holding a food which is attractive to hummingbirds;
a top cover which is positionable upon the upper tray and which includes a top portion for covering the upwardly-opening interior of the upper tray receptacle and wherein the top portion defines a first aperture through which a fruit fly is permitted to pass and a second aperture through which a hummingbird is provided access to the food held within the receptacle of the upper tray;
means interposed between the first aperture of the top cover and the interior of the base tray receptacle for providing a passageway network through which a fruit fly can pass into or out of the interior of the base tray receptacle through the first aperture; and
a closure assembly for shutting off the passageway network to prevent a fruit fly from passing into or out of the interior of the base tray receptacle or for opening the passageway network to permit a fruit fly to pass into or out of the interior of the base tray receptacle by way of the first aperture of the top cover.

13. The feeder as defined in claim 12 wherein the closure assembly includes a first member disposed between the interior of the base tray receptacle and the upper tray wherein the first member defines an opening therethrough, and the upper tray includes a hollow column having an interior passageway which communicates between the first aperture of the top cover and the opening defined in the first member of the closure assembly and the closure assembly includes a second member which is movable relative to the opening defined in the first member between a first condition at which the passageway network between the interior of the base tray receptacle and the first aperture of the top cover is open and a second condition at which the passageway network between the interior of the base tray receptacle and the first aperture of the top cover is shut off.

14. The feeder as defined in claim 13 wherein the first member is a first disc which is positioned across so as to span the interior of the base tray receptacle, the opening of the first member is a first opening which is defined in the first disc, the second member is a second disc, and the first and second discs are positioned in a stacked relationship within the base tray so that one of the first and second discs overlies the other of the first and second discs, and the second disc defines a second opening, and the first and second discs are movable relative to one another between a first condition at which the first and second openings of the first and second discs are disposed in substantially vertical registry with one another and a second condition at which the first and second openings of the first and second discs are out of vertical registry with one another.

15. The feeder as defined in claim 14 wherein the base tray includes a bottom and a post portion which is positioned substantially centrally of the bottom so as to extend upwardly therefrom, and each of the upper tray and the top cover defines a centrally-disposed opening which is substantially positioned in vertical registry with the post portion of the base tray when the upper tray and top cover are positioned upon the base tray for use of the feeder, and the post portion facilitates the suspension of the feeder from an overhead support structure; and wherein each of the first and second discs includes center holes which are positioned about the post portion when the discs are positioned within the base tray and so that when the first and second discs are moved relative to one another between the first and second conditions, the one of the first and second discs is rotated in position relative to the other of the first and second discs as said one of the first and second discs is rotated about the post portion.

16. The feeder as defined in claim 14 wherein the first disc is arranged in a stationary relationship with respect to the base tray and the second disc is movable in position relative to the first disc between the aforesaid first and second conditions.

17. The feeder as defined in claim 16 wherein the second disc includes a tab portion which extends outboard of the outer wall of the base tray enabling a user to move the second disc relative to the first disc between the aforesaid first and second conditions.

18. The feeder as defined in claim 16 wherein the hollow column of the upper tray is substantially disposed in vertical registry with the first opening of the first disc, and the first aperture of the top cover is disposed in substantially vertical registry with the passageway provided by the interior of the hollow column.

19. The feeder as defined in claim 12 wherein the upwardly-opening interior of the base tray receptacle includes an upper edge which is shaped to nestingly accept the upper tray directed downwardly within the base tray so that when the feeder is assembled for use, the upper tray is captured by the upper edge of the base tray.

20. A hummingbird feeder comprising:
a base tray including a receptacle having an upwardly-opening interior for holding food which is attractive to fruit flies;
an upper tray disposed above the base tray including a receptacle having an upwardly-opening interior for holding food which is attractive to hummingbirds;
a top cover including a cover portion for covering the interior of the receptacle of the upper tray and having a plurality of aperture groups including a first set of apertures which are regularly spaced about the cover portion of the top cover and a plurality of second apertures which are regularly spaced about the cover portion of the top cover for providing access to the interior of the upper tray and the hummingbird-attracting food held therein;
wherein the upper tray has a bottom and includes a plurality of hollow columns which are joined to so as to extend upwardly from the bottom of the upper tray and so that each hollow column is substantially disposed in vertical registry with a corresponding group of first apertures;
a first disc which is disposed between the bottom of the upper tray and the interior of the base tray and defining a plurality of openings wherein each defined opening is substantially disposed in vertical registry with a corresponding hollow column of the upper tray; and a second disc which is disposed in a stacked relationship with the first disc and which is movable relative to the first disc between a first condition and a second condition and defining a plurality of through-openings which are arranged in such a relationship with the openings defined in the first disc so that when the second disc is moved relative to the first disc to said first condition, each through-opening is substantially disposed in vertical registry with a corresponding opening defined in the first disc to thereby permit a fruit fly to pass from the interior of the receptacle of the base tray and the groups of first apertures of the cover portion of the top cover and so that when the second disc is moved relative to the first disc to said second condition, each through-opening is disposed out of vertical registry which any opening defined in the first disc to thereby prevent a fruit fly from exiting the interior of the receptacle of the base tray by way of the defined openings.

\* \* \* \* \*